W. D. McNAULL.
VEHICLE TIRE.
APPLICATION FILED OCT. 29, 1917.

1,392,953.

Patented Oct. 11, 1921.

Inventor:
William D. McNaull,
By Anson Hall, Atty.

UNITED STATES PATENT OFFICE.

WILLIAM D. McNAULL, OF TOLEDO, OHIO, ASSIGNOR TO MRS. MACIE K. McNAULL, OF TOLEDO, OHIO.

VEHICLE-TIRE.

1,392,953. Specification of Letters Patent. Patented Oct. 11, 1921.

Application filed October 29, 1917. Serial No. 198,922.

*To all whom it may concern:*

Be it known that I, WILLIAM D. Mc-NAULL, a citizen of the United States, residing at Toledo, in the county of Lucas and State of Ohio, have invented certain new and useful Improvements in Vehicle-Tires; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to pneumatic vehicle-tires of the kind described in patents issued to me October 3, 1911, No. 1,004,582, and July 20, 1915, No. 1,147,032, in which the tread-member, when in place on its wheel-rim, forms approximately a semicircle in transverse section, and which is of less transverse width than the wheel-rim and its retaining member or members. My invention relates, more particularly, to the tread-member of such tire and is designed to furnish a construction in which the marginal beads of the tread-member are constructed in such fashion as to effectively resist the wear and strain peculiar to the margins of a tread-member of the sort referred to when held in the clasp of the retaining members of the tire.

For the purpose of attaining these and other advantages hereinafter referred to my invention consists of the construction and arrangement of parts hereinafter described, and illustrated in the accompanying drawings, in which—

Figure 1:
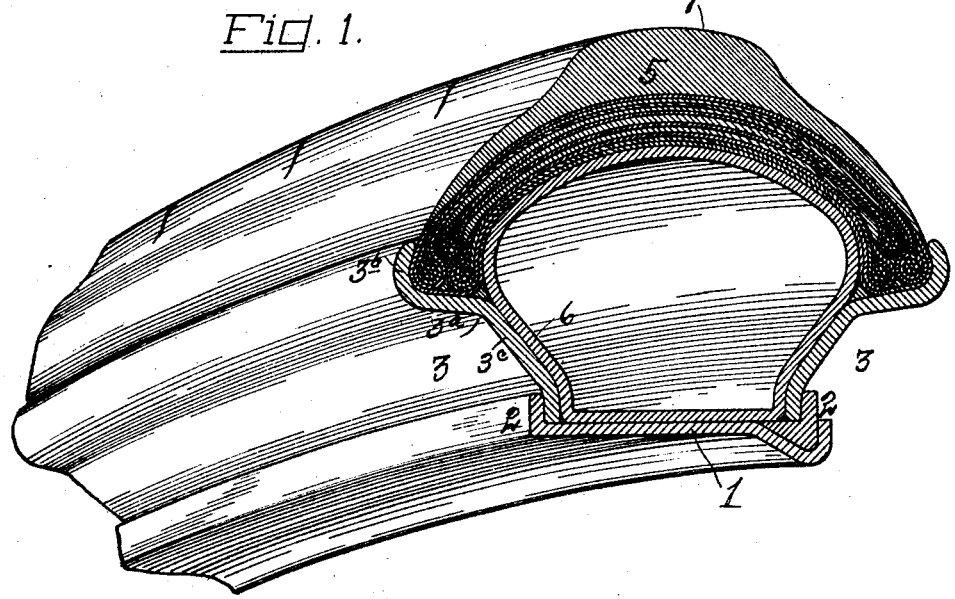
Figure 2:
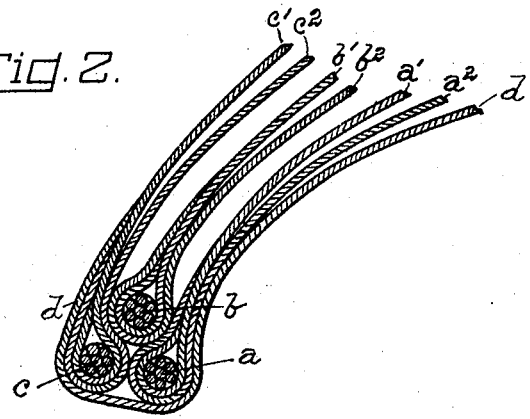

Figure 1 is a segment of a tire, showing, in transverse section, the tread-member hereinafter referred to, together with an illustrative form of tire-rim and retaining members for the tread-member, and Fig. 2, an enlarged diagrammatic illustration of the group of wire cables composing a bead of my tire, together with their associated strips of fabric.

Like letters and numerals of reference indicate like parts in both views.

In the drawings, 1 is a ring consisting of a band of steel forming a hoop which fits upon or forms part of the felly of a wheel and having at its margins shoulders or stops 2. 3—3 are rings the internal diameter of which corresponds to the external diameter of the ring 1. The inner edges of the rings 3 fit closely upon the ring 1 and are seated against the stops 2. The outer marginal portions of the rings 3 are bowed and flared outwardly as at $3^a$, to form seats for the beads of the tread-members, and inwardly, as at $3^b$, to furnish stops or shoulders against which said beads abut laterally. The portions $3^a$ and $3^b$ form recesses for the reception of the beads of the tread-member of the tire. The rings 3, between their inner edges and the portions $3^a$, are inclined or flared outwardly, as at $3^c$, at an angle to the vertical of approximately twenty degrees. The construction thus far described forms a wheel-rim having a deep circumferential channel and which, in effect, forms, in metal, somewhat more than the transverse half of the tire, considered as a whole.

5 is the tread-member of a pneumatic tire arched transversely as an arc of the longer curve of an ellipse, being formed of layers of a suitable fabric extending transversely and circumferentially of the tire and invested in flexible elastic vulcanized india rubber, and having non-extensible beads in the margins of the tread-member adapted for engagement with the marginal recesses in the rings 3. It will be understood that owing to the elliptical transverse curve formed by this peculiarly shaped tread-member, the direct pull upon the beads and the amount of their torsional motion are greater than in the usual construction in which the tread-member approaches more nearly the semi-circular in cross-section. For these reasons the beads formed as herein specified, taken in connection with their retaining members, become a vital necessity in resisting the peculiar wear and strains due to the kind of arch referred to.

The construction of the tread-member may be conveniently described by reference to Fig. 2. At each margin of the tire are three cables or groups of wires, the groups being lettered, respectively, $a$, $b$ and $c$. $a^1$ is a strip of fabric extending across the tire and having its margins folded around the groups $a$. $a^2$ is a like strip of fabric disposed in like manner and having its margins folded around the groups $a$ and embracing also the bights or folds of the strip $a^1$. $b^1$ and $b^2$ are strips of fabric superposed upon the strips just referred to and extending across the width of the tire and having their margins folded around the groups of wires $b$. $c^1$ and $c^2$ are strips of fabric superposed upon the previously mentioned strips and disposed in relation to the tire and to the groups of wires $c$ in the same manner as above described. The groups of wires $a$ $b$ and $c$ are now disposed in relation to each other in compact form, preferably in the triangular form illustrated in Fig. 2. $d$ is a strip of fabric extending across the inner side of the tread-member of the tire and folded around and embracing collectively the three groups of wires and having its margins folded onto and overlapping the outside groups of wires and their coverings. The several groups of wires forming the beads, together with the several layers of fabric, are mingled with and overlapped by vulcanized india rubber in the usual manner, which is well understood and which, forming no part of this invention, need not be here further described.

The beads thus formed are composed in part of elastic material, but the wires or cables are inextensible. As above stated the short flexible transverse arch of my tire would in use, ordinarily cause a limited rotary or torsional movement of the beads in their seats, thus causing undue friction and wear at these points. To obviate this difficulty the beads are made of less circumference than the seats $3^a$ which are slightly outwardly inclined. The outer elastic edges of the beads being slipped over the inner edges of the seats $3^a$ the inner pneumatic tube 6 is inflated under high pressure which forces the beads outwardly upon the inclined planes of the seats $3^a$ and against the stop $3^b$. The combined effect of the wedge-like action of the portions $3^a$, the stops $3^b$ and the pneumatic tube is to compress the rubber of the beads to practically the limit of their elasticity and to form a substantially solid joint in which there is no yielding or torsional turning or friction and which excludes moisture. After the beads have been forced into position and compressed by the high pressure of the inner tube the pressure may be reduced to approximately fifty pounds per square inch which is found to be ample for tires constructed as herein explained.

Should the outer layers of fabric be ruptured and their hold upon either of the groups of wires $c$ be destroyed, it will be seen that the next succeeding layers of fabric and their hold upon the beads of the next succeeding group of wires will remain unaffected; that even if the layers of fabric except those which embrace the group of wires $a$ were loosened or torn, the inner layers $a^1$ and $a^2$ and the group of wires 1 would remain intact; that the tread-member would still be held in position, and that the inner pneumatic tube 6 would still remain protected.

The advantages of the tire here described are, 1st, that the flexible tread-member, being of about half the usual transverse area, requires, without sacrifice of flexibility, much less india rubber than is commonly employed, thus greatly reducing the first cost of the tread-member; 2d, that since the sides of the structure are of metal, the tire is provided with an armor which protects what is usually the most vulnerable part of the tire, preventing rim-cuts and puncture of the inner pneumatic tube except through the tread of the casing,—a mishap of unusual occurrence; 3d, that owing to the shortened transverse arc of my tread-member and the tight circumferential clasp of its beads, my invention overcomes the tendency of tread-members, as usually constructed, to creep or slip upon their inner bearings; 4th, that for the reasons last above stated my tire is enabled to employ a thicker peripheral tread-portion, —(7)— than is practicable in a tire of the usual construction in which, for reasons well understood by tire manufacturers, the relative thickness of this part is necessarily limited; 5th, that by reason of the shortened transverse arch of my tire the strips of fabric employed are less likely to have wrinkles and folds and to produce inequalities at the margins of the tread-members than in tires of the usual circular form in cross-section; 6th, that the inflation of the pneumatic tube 6 forces the beads of the tread-member outwardly and into position and there closely holds them in recesses 4 without the addition of further retaining devices, and, 7th, that the torsion of the beads and the attrition of the bead-members upon each other and upon their retaining members and the surrounding rubber are, by their triangular arrangement and extreme tension reduced to a minimum.

Having described my invention, what I claim and desire to secure by Letters Patent, is—

1. In a pneumatic vehicle-tire, a flexible tread-member arched transversely to form approximately a half circle and having in each margin an elastic bead including inextensible triangularly disposed groups of wires and a series of superposed strips of fabric extending across said tread-member and in the opposite margins of which strips said groups of wires are separately folded, and circumferential supports for said beads, the beads being of less normal circumference than the supports.

2. A vehicle-tire comprising a pair of outwardly flaring rings having between them a deep circumferential channel and provided respectively with a circumferential marginal channel; a flexible tread-member arched transversely to form approximately a half circle and having elastic marginal beads adapted for engagement with said recesses, said beads being normally of less circumference than said recesses and including inextensible groups of wires separately folded in the margins of superposed strips of fabric extending across said tread-member, and a pneumatic tube disposed in said channel and adapted by its inflation to force said beads into said recesses and to there retain the same.

3. In a vehicle-tire, a tread-member arched transversely as—approximately—a semi-circle, said member having at its margins beads formed of inextensible wires invested in elastic material, combined with retaining devices for said beads, said retaining devices being of greater circumference than the normal circumference of said beads.

In testimony whereof I affix my signature in presence of two witnesses.

WILLIAM D. McNAULL.

Witnesses:
GERTRUDE BRACKER,
JOHN H. JAMESON.